April 21, 1959     F. A. McDOUGAL, SR., ET AL     2,882,987
ANTI-THEFT DEVICE FOR AUTOMOBILES
Filed May 1, 1956                                  2 Sheets-Sheet 1
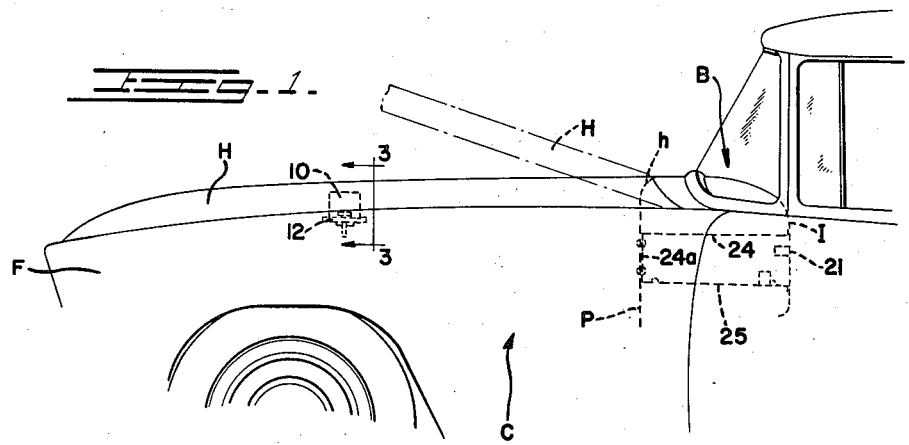
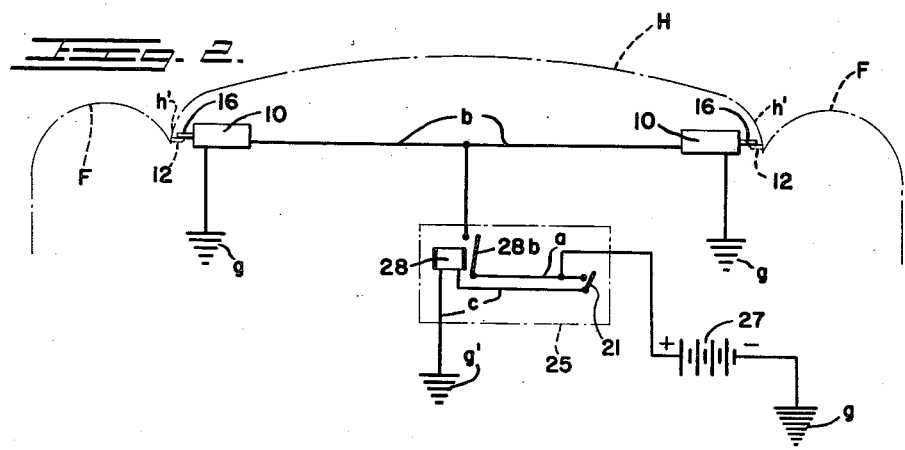
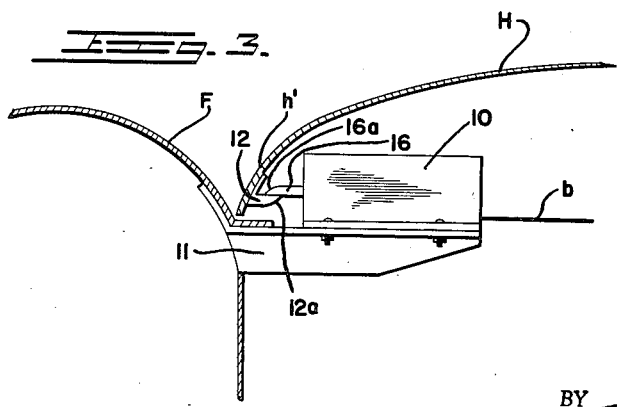
INVENTORS
PAUL A. McDOUGAL, Sr. &
FRANK P. PILEGGI
BY
ATTORNEY

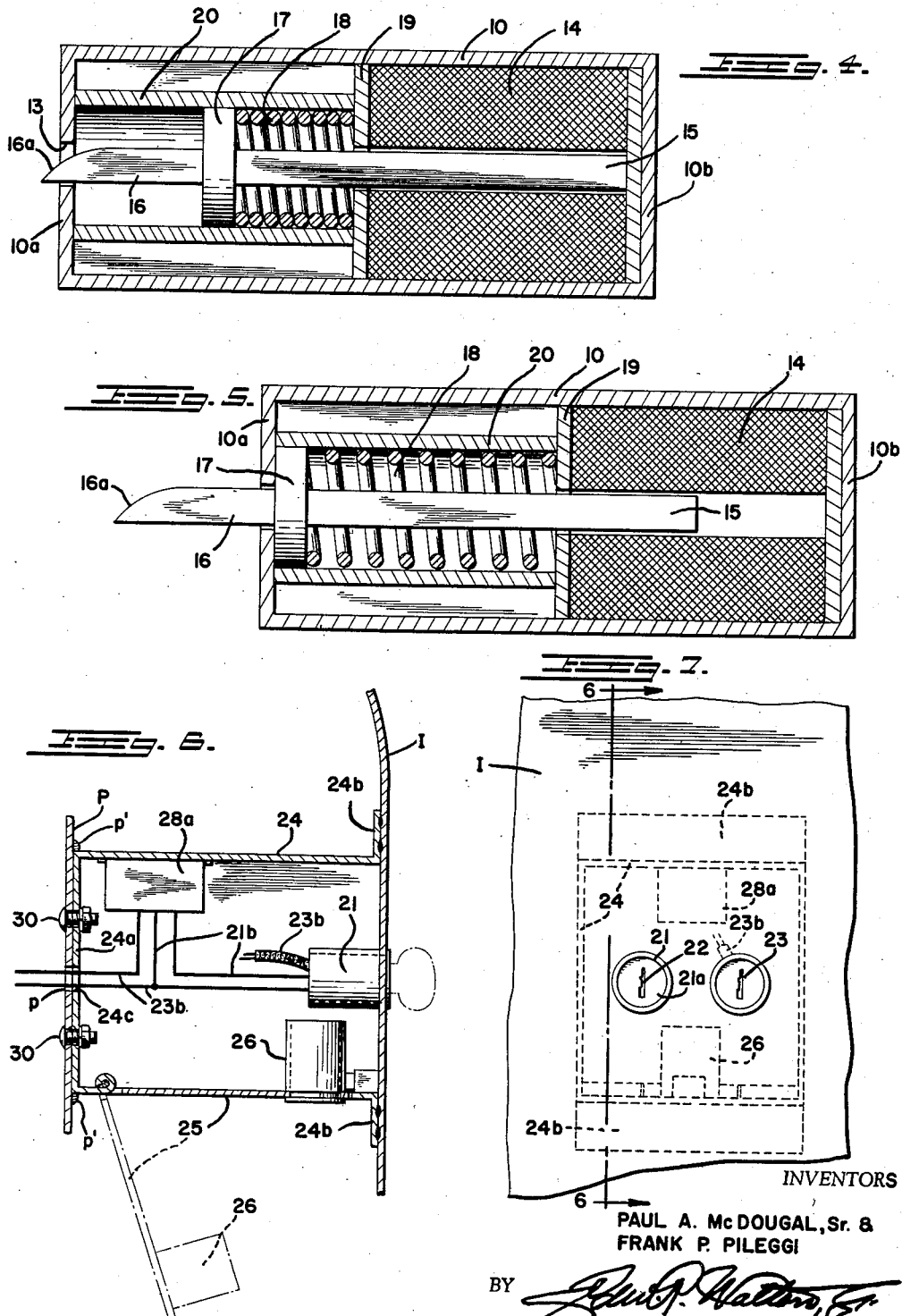

United States Patent Office 2,882,987
Patented Apr. 21, 1959

2,882,987
ANTI-THEFT DEVICE FOR AUTOMOBILES

Paul A. McDougal, Sr., and Frank P. Pileggi, West Palm Beach, Fla., assignors of one-third to Frederick G. Seelmann, Palm Beach, Fla.

Application May 1, 1956, Serial No. 582,012

2 Claims. (Cl. 180—82)

The present invention relates to an improved anti-theft device for automobiles and which device forestalls the starting of the automobile engine by unauthorized persons.

It is known that heretofore a great many anti-theft devices, of the above stated kind, have been proposed, including engine hood-locks; but a significant fact is that none has been employed as standard equipment and only a few as accessories and, at the present time, none is employed to our knowledge which actually and totally prevents tampering with the ignition, as by a jumper to start the engine, when the anti-theft device is in its locking condition.

The primary object or aim of the present invention is to provide an extremely simple and relatively inexpensive anti-theft device for automobiles which has few parts so distributed and mounted on a modern-day automobile as to be concealed and rendered inaccessible for tampering by an unauthorized person; which will maintain the hood locked against opening for access to the battery and ignition system and circuitry thereunder and will maintain the ignition-switch and the circuitry thereto shielded from access—except for the insertion of the proper key thereinto—at all times the device is in its operating condition, without the exercise of any thought or action of the driver or other person, whether the automobile is mobile or immobile; and which can be rendered inoperative only by a deliberate action of any authorized person possessing a proper key or other similar complemental coacting implement.

Other objects of the invention will be apparent from the following detailed description.

The invention resides in the organizational combination and arrangement of cooperating parts employed and in their sundry details of construction, all functioning to produce a unitary result, as more fully described in connection with the accompanying drawings and as pointed out in the appended claims.

In the drawings, which illustrate the preferred construction and organization of the invention as at present devised—

Figure 1 is a fragmentary side elevation of the forward portion of a modern automobile, having a one-piece hood, and showing in dotted lines the disposition of the mechanical parts of the invention on the automobile;

Figure 2 is a diagrammatic view illustrating the disposition of the parts of the invention, and their interconnecting circuitry, in connection with the hood of an automobile, shown in dot and dash lines;

Figure 3 is a sectional view taken substantially on line 3—3 of Figure 1 to illustrate structural details at one side of the hood;

Figure 4 is an enlarged longitudinal sectional view of the improved hood-lock bolt means, the bolt thereof being the armature of a solenoid and being shown withdrawn to its unlocking position;

Figure 5 is a view similar to Figure 4 and showing the hood-lock bolt projected to and normally held in its locking position by a biasing spring means;

Figure 6 is a longitudinal sectional view, taken substantially on line 6—6 of Figure 7, to illustrate details of construction of the shield-box of the invention provided and mounted between the instrument panel and the dash or fire board of the automobile and having mounted thereon the ignition switch and the hood-lock switch by which their circuitry is rendered inaccessible; and Fig. 7 is a fragmentary face view of the instrument board of the automobile, illustrating the shield-box behind the same and the disposition of the key-controlled ignition switch and the key-controlled hood-lock switch.

As stated in the above objects, the present invention is to prevent tampering with the automobile by a very simple, inexpensive and effective means, so that an unauthorized person may not be able to start the engine, and thereby make off with the automobile, without demolishing parts of the automobile in such a manner as would attract attention. Since most such thefts of automobiles are accomplished by short-circuiting or jumping the key-locked ignition switch, either at the switch or at some place in the circuit in the engine compartment, use is made of a very simple lock-bolt means to lock the hood to prevent access to the engine compartment and of a shielding-housing enclosing the ignition switch and its circuits that extend between the instrument panel and the fire partition P, so that access may not be gained thereto except by a proper key, said lock-bolt means being also controlled to unlock the hood only by a proper key cooperating with an instrumentality in the same shielding means that shields the ignition switch. By this arrangement, the lock-bolts are controlled independently of the ignition switch so that no thoughtful effort or action is imposed upon the driver of an automobile, when he parks the same and leaves the same, to maintain this anti-theft device effective.

Therefore, according to the present invention, at least two solenoid-actuated lock-bolt mechanisms 10 are horizontally disposed, one on each side of the engine compartment C of an automobile, as shown in Figure 2, and each is disposed upon the usual bracket or support 11 to which the inner edges of the fenders F are supported so as to underlie the hood when in its closed position (see Fig. 3) and to cooperate with a keeper bracket 12 secured, as by welding or the like, to the inner face of a downwardly extending portion h' and near the side edge of said portion h'. The bracket or support 11 herein shown may be varied in formation according to the particular manufacturer of various automobiles, but in all there is an equivalent member similar to the member 11; and the lock-bolt mechanism 10 and its keeper 12 are disposed distally of the rear hinged edge h, preferably midway of the hood with respect to its fore and aft length.

Each lock-bolt mechanism 10 comprises an elongated casing closed at both ends, one of said ends having an aperture 13 therein. The end portion of the casing opposite the aperture 13 contains a solenoid 14 whose core or armature 15 provides the lock-bolt having a horizontal detent end 16 slidable through aperture 13. A collar 17 surrounds the armature 15 and is suitably secured thereto, in any convenient manner, at a point remote from the free end of the detent 16; and a compression spring 18 is interposed between the collar 17 and a plate 19 bearing against the inner end of the solenoid 14, thereby biasing the armature or lock-bolt 15 to normally project the detent 16 in its extended position through the aperture 13, as shown more particularly in Figure 5. It is preferred, although not entirely necessary, that a guide sleeve 20 surround the collar 17 and the spring 18 between the plate 19 and the apertured end 10ᵃ of the housing 10. The winding of the solenoid 14 is such that, when energized, it will attract and move the armature 15 toward the closed end 10ᵇ of the housing 10, thereby withdrawing the detent 16 inwardly of the housing 10, as shown in Figure 4.

The keeper bracket 12 may comprise a section of an angle bar so that one leg of the angle bar may be welded or otherwise suitably secured to the hood and its other leg 12ᵃ project horizontally inwardly of the hood in the form of a lip and in cooperative alignment with the horizontal detent 16, when the latter is projected to its locking position (shown in Figs. 2, 3 and 5), so as to underlie and abut with said detent and thereby prevent the hood H from being raised to an elevated position as indicated in dotted lines in Figure 1.

The solenoid windings 14 are electrically connected with a key-switch 21 mounted on the instrument panel I in the usual manner so that the key slot 22 in the rotatable barrel 21ᵃ is accessible from within the body B of the automobile, and this key-switch 21 is positioned adjacent the usual ignition key-switch 23. A tubular shield member 24 of fairly heavy gauge metal is provided and is dimensioned to extend from the inner face of the instrument panel I to the fire partition P in fitting contact therewith and to which it is secured; and is also of such dimensions as to entirely embrace the area on the panel board occupied by the two key-switches 21 and 23 and to form a shielding enclosing the electrical conductors 21ᵇ of the lock switch 21 and the electrical conductors 23ᵇ of the ignition circuitry to the ignition switch 23, both sets of conductors extending from under the hood through an opening or openings p in the partition P to their respective switches. As shown, this anti-theft shielding 24 may take the form of a box-like member having a closed end 24ᵃ and an opposite open end formed with a perimetrical lateral flange 24ᵇ extending outwardly therefrom. The closed end 24ᵃ of the shield-housing 24 is provided with one or more openings 24ᶜ through which the conductors 21ᵇ and 23ᵇ may extend from under the hood through openings p in the partition P registering with openings 24ᶜ into the housing 24. If the device is factory installed, the flange 24ᵇ may be welded to the rear face of the instrument panel as shown in Figure 6 and, since its end 24ᵃ fits tightly flush against the fire partition P, no access is permitted to the circuits 21ᵇ and 23ᵇ, particularly should the partition P be formed with a raised rib p' to fittedly surround the end 24ᵃ of the shield-housing. Should the device be installed as an accessory, the closed end 24ᵃ may be riveted or bolted, as at 30, to the partition P. The shielding housing 24 is provided with an access door 25, preferably on its under side and hinged adjacent its closed end 24ᵃ, so that the door may depend therefrom, when open, next to the partition P, to give access to the interior of the housing 24 from underneath the instrument panel I. The door 25 is held closed by a key-lock 26 disposed within the interior of the housing 24 and is actuated only from the exterior of said housing by a proper key.

As shown in Figure 2, the solenoids 14 of the locking devices 10 are connected to the positive side of the usual electric battery 27 by conductors a and b and are grounded to the frame of the automobile as indicated at g. The conductor a has interposed therein a relay 28, which is contained in a casing 28ᵃ disposed in the shield-housing 24. The relay 28 is connected with the battery 27 by a shunt circuit c through the single pole make-and-break key-actuated switch 21 and is grounded as indicated at g'. Thus, the electrical load to energize the solenoids 14 is carried through the make-and-break contact 28ᵇ of the relay 28 rather than through the lock-release switch 21.

In the operation of the device, with parts in the position shown in full lines in Figures 1, 2, 3, 5, 6 and 7, the hood H is held locked into closed position by the lock-mechanisms 10—12. Whenever it is desired to gain access to the engine or to the other mechanism under the hood H, the lock-mechanism can be released only by the insertion of a proper key into the key-switch 21 and then actuating the same to close said switch, thus energizing the relay 28, which closes make-and-break contact 28ᵇ, hence energizing the solenoids 14 which then withdraw the detents 16 of the lock-bolts 15 out of engagement with their keepers 12 against the biasing action of the springs 18. After the hood is open, the key, in the switch 21, is again manually operated to open the lock-release switch 21 which de-energizes relay 28, thus opening the make-and-break contact 28ᵇ causing a de-energizing of the solenoids 14. Thereupon, the springs 18 project the detents 16 to locking position as shown in Figure 5. When the hood H is again moved to closed position, the beveled lip portions 12ᵃ of the keepers 12 will ride upon complemental nose portions 16ᵃ of the detents 16 and cause them to move inwardly against the bias of their springs 18 until the keepers 12 pass below said detents, which will then be projected by the spring 18 to overlie the keepers until the lock-release switch 21 has been again operated as above described. The switch 21 is preferably of the type which will prevent its key from being withdrawn therefrom while the switch is in its "on" or closed position, thereby requiring the operator to open the switch 21 before its key can be removed therefrom. Such switches are so common in the art, that it is believed only a mention thereof is necessary.

From the above description and drawings, it will be observed that a very simple and inexpensive arrangement has been provided by the present invention for preventing tampering with the engine of an automobile or its ignition circuits, so that an unauthorized person cannot start the automobile unless he is possessed of a proper key or keys either to operate the ignition switch or to unlock the hood-lock release switch.

In hoods that are counter-balanced and biased to open partially or initially, when a latch at their front end is manually released, the device of the present invention may be used in addition thereto. However, it is preferred that a lock mechanism 10 of this invention be substituted for such latch and electrically connected in the circuit of the hood-lock release switch 21, so that the hood can only be unlocked from within the body B of the vehicle by means of the switch 21 on the instrument panel I, thus eliminating error by assuming the hood is theft-locked when, as a matter of fact, only the presently employed latch is holding the hood closed and the operator has failed to turn the switch 21 to de-energize the solenoids 14.

The present invention, except for the specific construction of the lock-bolt mechanisms 10 and the shielding box 24, utilizes standard parts and materials now on the market; and specially armored wires are not necessary because the shielding housing 24, of relatively thick gauge sheet steel, is more protective in rendering inaccessible the circuit conductors usually extended through the fire partition P to the ignition switch 23 and to the hood-release switch 21, in addition to housing the relay 28.

It is common knowledge that 90% or more of the motor vehicle thefts are done by using a coin, such as a 25¢ piece, or other jumper, to short-circuit the ignition switch under the dashboard or at points under the hood. Since the shield-housing 24 will be firmly secured as by welding or the like to the dashboard, or its closed wall 24ᵃ will be riveted to the partition P, depending upon whether the device is installed at the factory or is installed as an accessory, and, further, since this housing will abut tightly against the fire partition P and the instrument panel I, it will be impossible for anyone to tamper with the wiring to the switches 21 and 23 to short-circuit the same without demolishing the housing 24; and, since the hood will be locked by the cooperating lock devices 10 and 12 disposed wholly within the enclosure of the engine compartment, and the lock-bolts 15 thereof are not exposed to any crevice or joint through which they may be moved by an inserted implement, the hood may not be raised without damaging or demolishing the same to such an extent that the noise and effort involved would attract attention and would discourage any attempt to open the hood by such procedure. Consequently, the device of the present invention attains the objects above set forth and produces a practical and inexpensive anti-theft device.

Having thus described the invention and the manner in which the same is to be performed, it is to be understood that the invention is susceptible of certain changes and modifications which will be obvious to those skilled in the art and, therefore, the invention is not to be limited to the exact construction and disposition of parts herein shown and described, but only by the spirit of the invention and the scope of the appended claims.

That which is claimed, as new and to be secured by Letters Patent, is:

1. As a new article of manufacture, an auto-theft appliance for use with automobiles which have a hooded motor compartment separated from the body of the automobile by a fire-wall having an ignition-wire opening therein and are equipped with an instrument panel extending rearwardly and downwardly from said fire-wall and carrying a key-controlled ignition switch connected with the engine by electrical conductors passing through said opening, said appliance comprising a rigid one-piece tubular member of tool-resistant sheet metal dimensioned to be positioned under said instrument panel and extend between the inner face of said panel and the opposing face of said fire-wall for housing the ignition-conductors and to have its opposite ends spacially surround the area of the panel occupied by said key-controlled ignition switch and the area occupied by the ignition-wire opening in said fire-wall in tight fitting contact therewith respectively, the end of said tubular member adapted to contact said fire-wall being partially closed by an inwardly extending lateral flange having bolt-apertures therein, bolts adapted to pass through said fire-wall and through said apertures in said flange to secure the tubular member in position and inaccessible from under said instrument panel; an electrically actuated lock-means mountable wholly under said hood in an inaccessible cooperative position with the hood, when the hood is closed, and normally biased to lock the hood when the hood is closed; a key-controlled hood-release electrical switch mountable on the instrument panel to have its terminals housed by the end of the tubular member surrounding said ignition switch; and electric conductors extending through said tubular member and said ignition-wire opening in the fire-wall and connecting said lock-means with the terminals of said hood release switch.

2. The combination with a motor vehicle having a walled motor compartment covered by a separable hood thereby to enclose the contents of the compartment against access and, further, having an instrument panel mounted exterior of said compartment in spaced relation to one of the walls of said compartment, and a motor and its ignition system disposed within said compartment and connected with a key-controlled ignition switch mounted on said instrument panel by electric conductors passing through an opening in one of said compartment walls adjacent said panel; of an inseparable tubular member of tool-resistant material axially disposed between and having its ends fittedly abutting and secured to said panel and the adjacent wall of said compartment irremovably and surrounding said opening and said electrical circuit conductors and the terminal of said ignition switch, the said wall of the compartment is formed with a raised rib surrounding and in contiguous relation with the adjacent end of the tubular member to prevent the insertion of a thin implement between said wall and the end of the tubular member, lock means including co-operating lock members fixedly carried on an inner surface of said hood and on a stationary part wholly within said compartment and positioned to coact to lock said hood, when the hood is in closed position, electrical actuating means associated with said lock means for actuating the latter to unlock said hood and disposed wholly within said compartment and including electric circuit conductors passing through said adjacent wall into said tubular member at the area thereof defined by the adjacent end of said tubular member and electrically independent of the ignition system, and another key-controlled switch mounted on said instrument panel at the area thereof defined by the other end of said tubular member with only its key-receiving slot exposed on the exterior face of said panel and electrically connected with said last mentioned conductors within said tubular member.

References Cited in the file of this patent
UNITED STATES PATENTS

| | | |
|---|---|---|
| 1,200,267 | Sunnergren | Oct. 3, 1916 |
| 1,408,996 | Erickson | Mar. 7, 1922 |
| 1,856,391 | Keppler | May 3, 1932 |
| 1,889,343 | Bahnyak | Nov. 29, 1932 |
| 1,974,944 | Black | Sept. 25, 1934 |
| 2,035,895 | Kelly | Mar. 31, 1936 |
| 2,041,387 | Adams | May 19, 1936 |
| 2,360,227 | Hemphill | Oct. 10, 1944 |
| 2,576,816 | Wahlberg | Nov. 27, 1951 |